June 26, 1934.   G. A. HUMASON   1,964,436
KICK-OFF VALVE FOR AIR LIFT DEVICES
Filed Aug. 28, 1933   2 Sheets-Sheet 1

Inventor
Granville A. Humason.
Jesse R. Stone
Lester B. Clark
By
Attorney

June 26, 1934.                G. A. HUMASON                1,964,436
KICK-OFF VALVE FOR AIR LIFT DEVICES
Filed Aug. 28, 1933          2 Sheets-Sheet 2

Inventor
Granville A. Humason.
Jesse R. Stone
Lester B. Clark
By
Attorneys

Patented June 26, 1934

1,964,436

UNITED STATES PATENT OFFICE 1,964,436

KICK-OFF VALVE FOR AIR LIFT DEVICES

Granville A. Humason, Houston, Tex.

Application August 28, 1933, Serial No. 687,141

7 Claims. (Cl. 103—233)

My invention relates to a device for lifting liquid from deep wells by the use of air or other gaseous fluid, and has particular application to the control valves which regulate the passage of the pressure fluid into the eduction tube.

It is an object of the invention to provide means for controlling the operation of the inlet valve, which will operate positively and accurately at all times, so as to prevent the passage of pressure fluid to the tube at that level when it is desired that the valve be closed.

It is a further object of the invention to provide in connection with a valve of this character a check valve which prevents the passage of fluid from the tube to the outside thereof.

It is also an object to provide a device of this character so arranged that the interior of the tube shall be free of all obstructions so that a reciprocating plunger can be employed in combination therewith if desired.

It is also an object to provide a control valve operated by the liquid level in the well without reference to the fluid pressure.

Devices of this general character are becoming well known in the art and the drawings herewith are illustrative only of the control valve which forms the subject matter of this invention.

In Fig. 1 is a sectional view of a well casing having therein an eduction tube equipped with the invention, certain parts being in elevation and others in central, longitudinal section.

Figure 1:
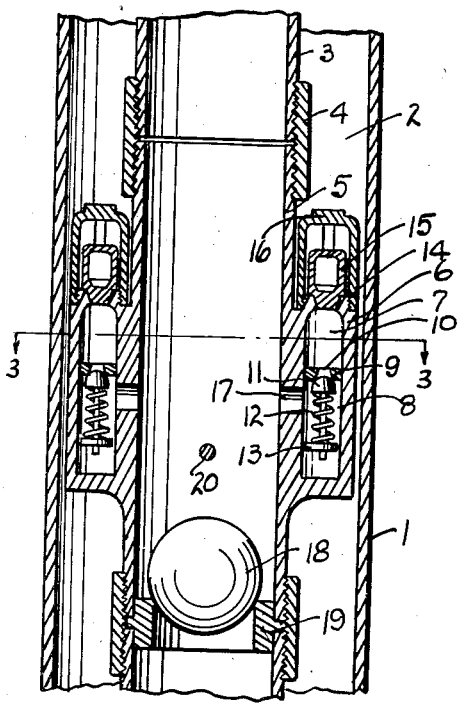

In Fig. 1, I have shown the well casing 1 which is ordinarily present in deep wells. This casing may be equipped at the upper end thereof in the usual manner and if the gas in the well is to be employed in operating the raising of the liquid it is to be understood that some means is provided for closing the upper end of the casing around the tubing so as to trap the air in the space 2 between the casing and the interior eduction tube 3. This arrangement is very common in the art and different means are employed for that purpose, and as this forms no part of the present invention it is not disclosed.

The eduction tube 3 within the casing is of the usual tubing used in flow lines to conduct the liquid from the well. It is made in sections connected together at their ends by couplings 4, and has at intervals along the tube a short section of tubing equipped with control valves, and it is to be understood that although only two of such valves are shown in Fig. 1, any desired number may be employed, and they may be spaced apart along the length of the tube.

Each control valve includes the section 5 of tubing having thereon one or more valve housings 6. I have shown these housings as integral with the tubular section of pipe, but obviously they may be secured to the pipe in any desired manner. Each housing 6 has therein a chamber 7 separated from a lower chamber 8 by a partition wall 9. Said wall has an opening therein adapted to be closed by a check valve 11 held in position closing the opening by a spring 12 surrounding a stem upon the valve, and supported at its lower end upon a plate 13 fixed to the wall of the housing.

The upper end of the chamber 7 has an inlet opening therein at 14 within which is fitted a valve 15, said valve being a float valve adapted to be raised from its seat by submergence in liquid. It has a hollow chamber to make it buoyant, and is housed within a cage 16 secured to the upper end of the housing 6.

There is an opening 17 from the lower chamber 8 to the interior of the tube through which the air or gas may enter the tube and mingle with the liquid therein. I have shown a pair of these control valves at each level, but it is to be understood that one alone can be employed where one is sufficient.

Below each of the control valves I have shown a standing valve 18 seated upon a valve seat 19 connected to the tube adjacent the lower end of the tubular section 5. This valve allows the passage of fluid upwardly through the tubing but prevents its movement backwardly toward the bottom of the well.

In operating a well with this type of control valve the tubing with the control valves thereon is lowered into the well so as to be submerged below the level of the liquid, and it is to be understood that there are a plurality of these valves connected with the eduction tube at different levels in the well. Ordinarily where a well is to be operated by air or gas under pressure, it would be necessary to exert a fluid pressure in the well outside of the tube sufficient to force the level of liquid in the casing downwardly to the lower end of the tubing so that the gas could find entrance at the lower end of the tube and mingle with the liquid therein to raise it to the surface. With kick-off valves of this character, however, the pressure of gas on the liquid in the casing and outside of the tube will force the level outside downwardly to a level adjacent the control valve.

As the valves 15 are submerged they will be off their seats and the liquid can pass through the valve housings and into the tube, and as the air reaches the level of the valve it will pass through the valve for a short period and enter the tube aerating the same and assist in raising the liquid upwardly to the surface. As the liquid level is reduced in height so that the valve 15 is entirely free, it will drop by gravity into its seat and will close off the passage of further pressure fluid to the tubing at that level. The pressure fluid will then act on the fluid in the casing to force it downwardly to the next valve which will act in the same way, finally closing it, when the liquid has entirely dropped below the valve and in each case the valve will thereafter remain closed until the liquid level raises above the valve.

The check valve 11 is provided for the purpose of preventing fluid from the interior escaping outwardly through the control valves. This is of importance in connection with the control valve in that pressure from within the tube due to the flow of liquid therethrough would tend to raise the valve 15 from its seat, but with the assistance of the check valve no escape of liquid from the control member is possible.

The valve 18 is free to rise to the limit of the transverse pin 20 and thereby allow a free flow of fluid through the tubing, but when the pressure fluid is released the liquid already in the tubing at the upper levels will be prevented from dropping back into the well.

Figure 4:
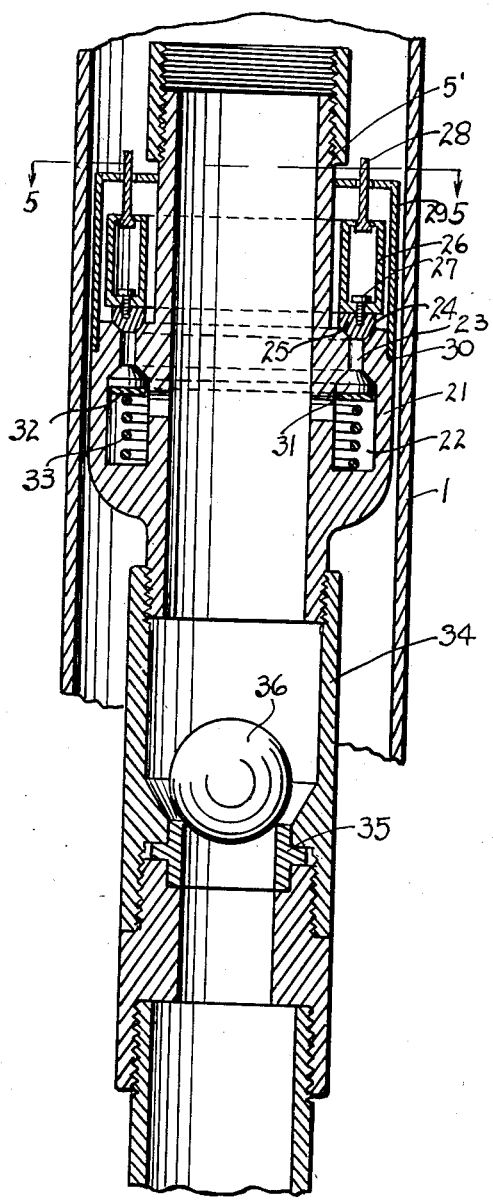
Fig. 4 is a central, longitudinal section through an eduction tube equipped with a slightly different embodiment of the invention.
Figure 5:
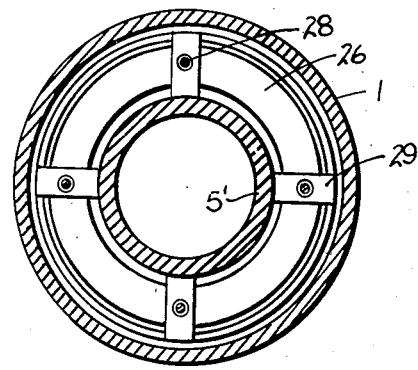
Fig. 5 is a transverse section on the plane 5—5 of Fig. 4.

In Fig. 4 I have shown a slightly different embodiment of the invention. The tubing is equipped with a section of pipe 5' which has thereon a lateral housing 21 which has therein an annular chamber 22 extending entirely around the tube as shown in Fig. 5. At the upper end of the chamber are a series of upwardly extending passages 23 for the pressure fluid. At the upper ends of the passages 23 is an annular groove or valve seat 24 adapted to receive a ring valve 25, and it will be understood that said valve is adapted to close all of the passages 23 from the chamber 22.

The ring valve 25 has thereon an annular float member 26 secured to the valve by cap screw 27. At the upper end of the float member 26 are a plurality of upwardly extending guide stems 28 which are adapted to fit slidably within openings in guide plates 29, said guide plates 29 being angularly shaped, and secured at their lower ends by welding or other similar means, to the recessed outer surface 30 of the valve housing. I have shown four of these guide members, but the particular number employed is not material. They serve to hold the valve properly spaced above the valve seat so that it may move accurately to closed position when the level of liquid in the well has been moved downwardly.

Figure 2:
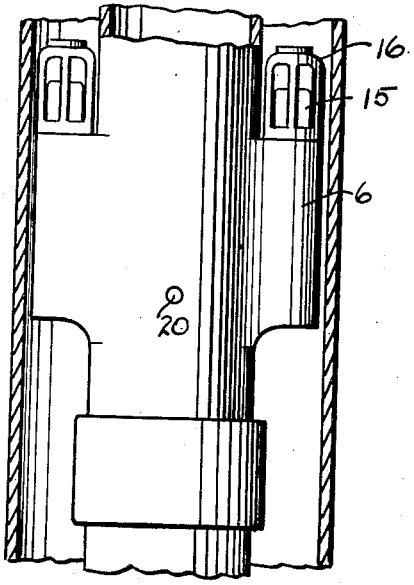
Fig. 2 is a longitudinal section through the control valve, taken approximately on the plane 2—2 of Fig. 3.
Figure 2:
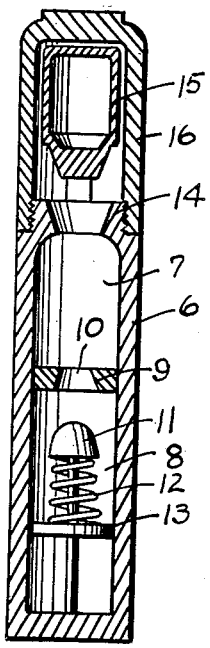
Figure 3:
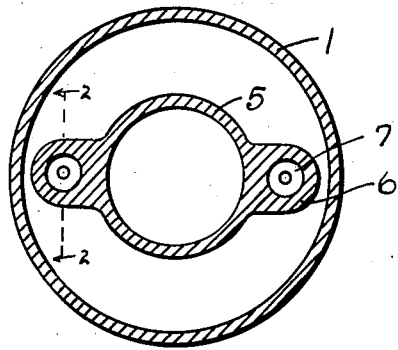
Fig. 3 is a transverse section on the plane 3—3 of Fig. 1.

I also provide a check valve 31 in the upper portion of the chamber 22 at each of the passages 23. These valves are supported upon an annular ring-shaped plate 32 and are held upwardly by a spring 33 supported on the lower wall of the chamber 22 and bearing against the under side of said plate. The structure of this valve is otherwise similar to that shown in Figs. 1 to 3, inclusive.

Below the control member is a valve chamber 34 which has midway of its length a seat ring 35 upon which the ball valve 36 is seated. The construction of this valve is otherwise not materially different from that previously disclosed.

Figure 6:
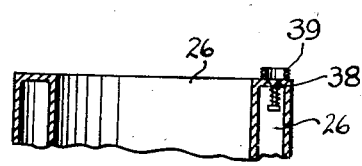
Fig. 6 is a broken detail of the upper end of the float valve showing an arrangement for exhausting the air therein.
Figure 7:
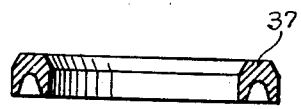
Fig. 7 is a section through one form of the check valve which I employ.

While I have shown a check valve 31 for each of the openings 23, it is to be understood that a ring valve 37, such as is shown in Fig. 7, may be employed if desired. It is also to be understood that the chamber within the float 26 may be a partial vacuum if desired, and in such case a valve shown at 38 in Fig. 6 may be employed, said valve being held into a seat so as to close the upper end of said chamber 26 and prevent the entrance of air thereto. I provide a threaded nipple 39 above the valve to which an air pump may be attached for exhausting the air from the chamber, thus increasing the effectiveness of the float action of the valve.

With my arrangement for operating the control valve through the float member, I am assured that the valve will remain closed after the level of liquid has sunk below the level of the valve. Furthermore, the valve will remain open as long as the float is submerged so that the fluid may easily pass through the opening at that level into the eduction tube. Further, the air will blow through the opening and past the valve until the valve is entirely seated. There will be, at the time the liquid level is sinking below the valve, a period when the air will rush through the opening into the tube to aerate and elevate the liquid in the tube. This device is particularly accurate in its action and reliable in use.

What I claim as new is:

1. In a device of the character described, a casing, a string of tubing therein, air inlets on said tubing arranged in vertical stages along the same, each of said inlets comprising a chamber, a control valve in the upper end of said chamber adapted to open when submerged in liquid and to close automatically when said liquid is exhausted, a passage from said valve chamber to the interior of said tubing and a back pressure valve between said control valve and said passage.

2. In a device of the character described, a well casing, a string of tubing therein, air inlets arranged in vertical stages along said tubing, each inlet comprising a valve chamber, a control valve closing the upper end thereof and adapted to be floated from its seat when submerged in liquid, a guide for said valve, a passage from said chamber to said tubing and a back-pressure valve between said passage and said control valve.

3. In a device of the character described, a well casing, a tubing therein, air inlets arranged at spaced intervals along said tubing, each said inlet comprising a valve chamber having an opening into said tubing, a valve closing the upper end of said chamber, automatic means to raise said valve from its seat when said valve is submerged, and means to prevent the passage of fluid from said tubing to said valve.

4. In a device of the character described, a well casing, a string of tubing therein, air inlets arranged at spaced intervals along said tubing, each inlet comprising a chamber having a passage into said tubing, a valve closing the upper end of each of said chambers and means to prevent the flow of liquid from said tubing through said chamber.

5. In a device of the character described, a string of well tubing, an air inlet arranged on the said tubing, said inlet comprising a valve chamber having a passage into said tubing, oppositely opening valves in said chamber adapted to admit fluid through said passage to said tubing when submerged in liquid and to prevent its exit therefrom at all times.

6. In a device of the character described, a string of tubing having air inlets thereon, each of said inlets including a chamber having a passage to the interior of said tubing, means to admit fluid to said chamber only when said chamber is submerged in liquid and means to prevent the passage from said tubing through said chamber.

7. In a device of the character described, a string of tubing, air inlets thereon comprising chambers each having a passage connecting with the interior of said tubing, a downwardly opening valve above said passage, a ring valve closing the upper end of each of said chambers and a hollow sealed chamber on said ring valve in the manner described.

GRANVILLE A. HUMASON.